United States Patent
Zhou et al.

(10) Patent No.: US 10,181,963 B2
(45) Date of Patent: Jan. 15, 2019

(54) DATA TRANSFER METHOD AND SYSTEM

(71) Applicant: Tencent Technology (Shenzhen) Company Limited, Shenzhen (CN)

(72) Inventors: Feihu Zhou, Shenzhen (CN); Liqiang Xie, Shenzhen (CN); Yingpai Song, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 170 days.

(21) Appl. No.: 15/169,060

(22) Filed: May 31, 2016

(65) Prior Publication Data
US 2016/0277215 A1 Sep. 22, 2016

Related U.S. Application Data

(63) Continuation of application No. PCT/CN2014/095215, filed on Dec. 27, 2014.

(30) Foreign Application Priority Data

Dec. 30, 2013 (CN) .......................... 2013 1 0745744

(51) Int. Cl.
*H04W 4/00* (2018.01)
*H04L 12/64* (2006.01)
(Continued)

(52) U.S. Cl.
CPC .......... *H04L 12/6418* (2013.01); *H04L 45/72* (2013.01); *H04L 47/193* (2013.01)

(58) Field of Classification Search
CPC .................................................. H04L 12/6418
See application file for complete search history.

(56) References Cited

U.S. PATENT DOCUMENTS 6,985,459 B2 * 1/2006 Dickson ................. H04L 29/06
370/328
7,275,093 B1 * 9/2007 Freed ..................... H04L 69/161
370/470
(Continued)

FOREIGN PATENT DOCUMENTS

CN 1812316 A 8/2006
CN 101030844 A 9/2007
(Continued)

OTHER PUBLICATIONS

ISR and Written Opinion to PCT/CN2014/095215, dated Mar. 31, 2015, (11p).
(Continued)

*Primary Examiner* — Guang W Li
(74) *Attorney, Agent, or Firm* — Brinks Gilson & Lione

(57) ABSTRACT

The present disclosure relates to a method and a device for transferring data between multiple clients and a destination node. The method includes: receiving request data sent by the plurality of clients, adding a unique label to the request data sent by each client, and sending the labeled request data to the second node; removing the labels from the request data, and sending the request data with the labels removed to the destination node for processing; receiving processing result data returned by the destination node, adding unique labels to the processing result data, and returning the processing result data with the labels to the first node; removing the labels from the processing result data and returning the processing result data with the labels removed to the clients corresponding to the labels.

22 Claims, 13 Drawing Sheets

(51) Int. Cl.
*H04L 12/721* (2013.01)
*H04L 12/801* (2013.01)

(56) References Cited

U.S. PATENT DOCUMENTS

| | | | |
|---|---|---|---|
| 7,493,383 B1 | 2/2009 | Mukerji | |
| 7,974,284 B2* | 7/2011 | Chen | H04L 12/66 370/392 |
| 8,630,204 B1* | 1/2014 | Williams | H04L 69/168 370/253 |
| 8,971,327 B2* | 3/2015 | Jabbari | H04L 45/04 370/328 |
| 9,160,609 B2* | 10/2015 | Dunbar | H04L 12/4625 |
| 9,178,810 B1* | 11/2015 | Singh | H04L 45/50 |
| 9,342,620 B2* | 5/2016 | Joel | G06F 17/30905 |
| 9,578,137 B1* | 2/2017 | Sham | H04L 29/08765 |
| 2001/0025321 A1* | 9/2001 | Tang | H04L 45/00 709/246 |
| 2002/0010765 A1* | 1/2002 | Border | H04B 7/18582 709/220 |
| 2002/0066036 A1* | 5/2002 | Makineni | H04L 12/4633 726/13 |
| 2002/0085507 A1* | 7/2002 | Ku | H04L 12/46 370/255 |
| 2002/0085565 A1* | 7/2002 | Ku | H04L 12/46 370/395.42 |
| 2003/0065711 A1* | 4/2003 | Acharya | H04L 29/12009 709/203 |
| 2004/0044744 A1* | 3/2004 | Grosner | H04L 29/06 709/217 |
| 2004/0114595 A1* | 6/2004 | Doukai | H04L 45/00 370/389 |
| 2006/0155872 A1* | 7/2006 | Charzinski | H04L 45/04 709/238 |
| 2007/0070906 A1* | 3/2007 | Thakur | H04L 69/16 370/235 |
| 2007/0115913 A1* | 5/2007 | Li | H04L 12/4633 370/349 |
| 2007/0127493 A1* | 6/2007 | Tsang | H04L 47/10 370/395.5 |
| 2008/0037420 A1* | 2/2008 | Tang | H04L 1/1607 370/229 |
| 2008/0046714 A1* | 2/2008 | Suganthi | H04L 63/0428 713/150 |
| 2008/0089347 A1* | 4/2008 | Phillipi | H04L 41/083 370/400 |
| 2008/0225721 A1* | 9/2008 | Plamondon | H04L 47/10 370/235 |
| 2008/0244744 A1* | 10/2008 | Thomas | H04L 63/1408 726/23 |
| 2008/0256247 A1* | 10/2008 | Mangin | H04L 63/1458 709/228 |
| 2009/0016458 A1* | 1/2009 | Asati | H04L 12/2801 375/261 |
| 2012/0008528 A1* | 1/2012 | Dunbar | H04L 12/462 370/255 |
| 2012/0054316 A1* | 3/2012 | Piazza | H04L 47/193 709/219 |
| 2014/0006578 A1* | 1/2014 | Kohn | H04L 67/1027 709/223 |
| 2014/0281018 A1* | 9/2014 | Waclawsky | H04L 47/193 709/235 |
| 2014/0355442 A1* | 12/2014 | Isobe | H04L 69/16 370/235 |
| 2015/0358238 A1* | 12/2015 | Williams | H04L 47/193 370/235 |
| 2016/0212759 A1* | 7/2016 | Schliwa-Bertling | H04L 69/14 |

FOREIGN PATENT DOCUMENTS

| | | |
|---|---|---|
| CN | 102291808 A | 12/2011 |
| CN | 102638582 A | 8/2012 |

OTHER PUBLICATIONS

Office Action dated Oct. 10, 2017 for Chinese Application No. 201310745744.1, 8 pages.

* cited by examiner

DATA TRANSFER METHOD AND SYSTEM

CROSS-REFERENCE TO RELATED APPLICATIONS

The application is a continuation of PCT Application No. PCT/CN2014/095215, filed on Dec. 27, 2014, which claims priority to Chinese Patent Application No. 201310745744.1, filed on Dec. 30, 2013, both of which are incorporated by reference in their entirety.

FIELD OF THE DISCLOSURE

The present disclosure relates to computer communications technologies, and particularly to a method and system for transferring data.

BACKGROUND OF THE DISCLOSURE

With the development of computer communications technologies and popularization of the Internet, more and more clients are connected to the Internet. Many clients send request data to the backend, and most of the request data is concurrent. As the access capacity of individual backend equipment is limited, a large number of pieces of backend equipment are used to accelerate the processing of request data. Thus, equipment costs and maintenance costs have increased.

Therefore, how to improve the single-unit access capacity of equipment to reduce costs has become a technical problem and needs to be resolved.

SUMMARY OF THE DISCLOSURE

In view of the above-mentioned problem, the present disclosure provides a method and system for transferring data to improve the single-unit access capacities of equipment.

A method for transferring data between a plurality of clients and a destination node, wherein at least a first node and a second node are situated between the plurality of clients and the destination node, comprising: receiving, by a processor of the first node, request data sent by the plurality of clients, adding a unique label to the request data sent by each client, and sending the labeled request data to the second node by using a first connection channel; removing, by a processor of the second node, the labels from the request data corresponding to each of the clients, and sending the request data with the labels removed to the destination node for processing; receiving, by the processor of the second node, processing result data returned by the destination node corresponding to the request data, adding unique labels to the processing result data, and returning the processing result data with the labels to the first node by using the first connection channel; removing, by the first node, the labels from the processing result data and returning the processing result data with the labels removed to the clients corresponding to the labels.

A data transfer system used for transferring data between multiple clients and a destination node, comprising a first node and a second node, wherein: the first node having one or more processors coupled with a memory is used to: receive request data sent by the multiple clients, add a unique label to the request data sent by each client, and send the labeled request data to the second node by using a first connection channel; the second node having one or more processors coupled with a memory is used to: remove the labels from the request data corresponding to each of clients, and send the request data with the labels removed to the destination node for processing; the second node is used to: receive processing result data returned by the destination node corresponding to the request data, add unique labels to the processing result data, and return the processing result data with the labels to the first node by using the first connection channel; the first node is used to: remove the labels from the processing result data and return the processing result data with the labels removed to the client corresponding to the labels.

Compared with the prior art, in the present example, the first node, on receiving the request data sent by multiple clients, adds a corresponding label to the request data sent by each client, and sends the labeled request data to the second node by using the same connection channel; the second node removes the label from the request data and sends the unlabeled request data to the destination node for processing. The second node receives the processing result data returned by the destination node respectively corresponding to each request data, adds the corresponding label to each processing result data, and returns the labeled processing result data to the first node by using the same connection channel; the first node returns the unlabeled processing result data respectively to the client corresponding to the label.

The label corresponding to a client is globally unique. Therefore, even if the first node sends the request data corresponding to multiple clients to the second node by using the same connection channel, the second node can determine the correspondence between the request data and clients based on the label in the request data.

In addition, the first node can also determine to which client the processing result data should be returned based on the label in the processing result data. Therefore, the data transfer between the first node and second node is port-independent. Multiple requests sent by multiple clients to the first node by using different connections may be sent to the second node by using the same connection. Thus, converged connection is implemented to save port resources, resulting in improved access capacity of the equipment as a single unit and hence reduced costs.

To facilitate understanding of the above purpose and other purposes, characteristics, and benefits of the present disclosure, the following describes in detail the preferred examples of the present disclosure in combination with drawings.

BRIEF DESCRIPTION OF THE DRAWINGS

To explain the technical solutions of the examples of the present disclosure, accompanying drawings used in the examples are followed. Apparently, the following drawings merely illustrate some examples of the disclosure, but for persons skilled in the art, other drawings may be obtained without creative works according to these drawings.

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION OF ILLUSTRATED EXAMPLES

Figure 1:
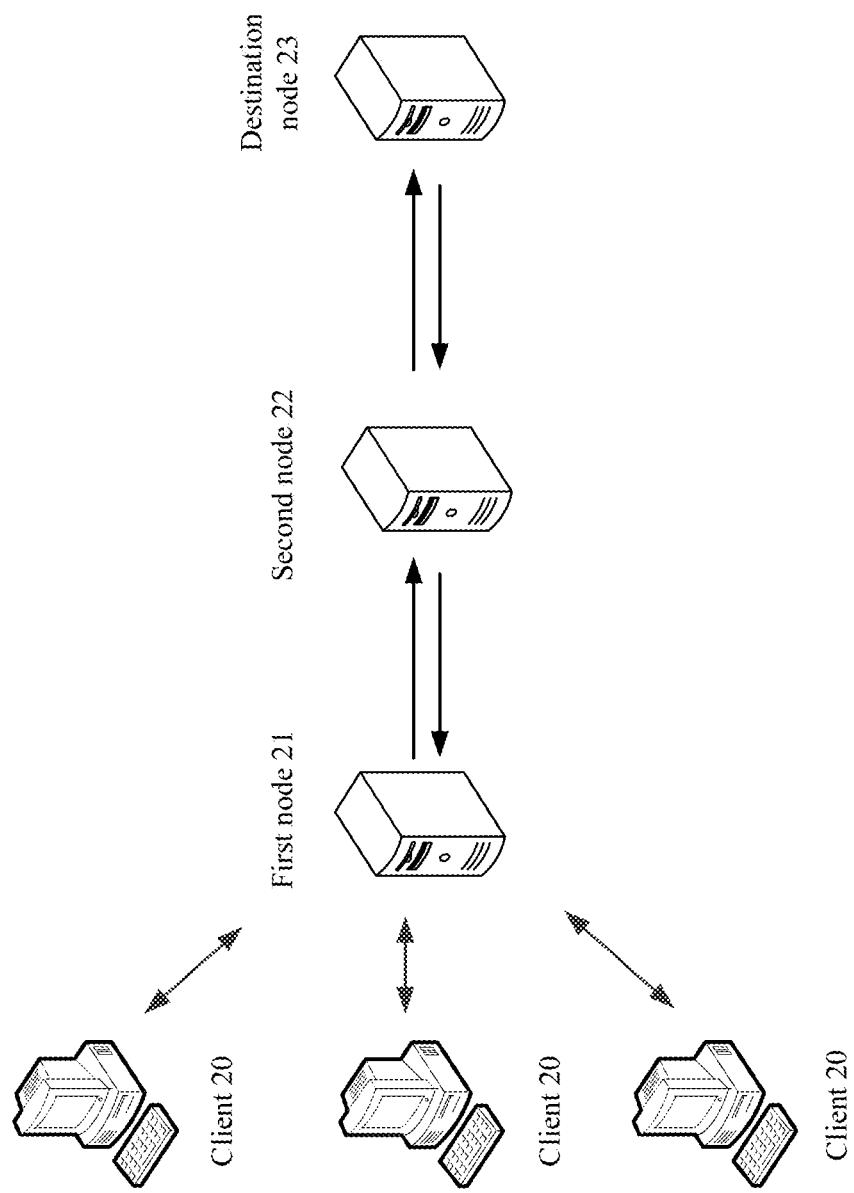
FIG. 1 shows the schematic diagram of application environment of the data transfer method provided by the examples of the present disclosure.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment or the same example. Furthermore, the particular features, structures, or characteristics may be combined in any suitable manner in one or more embodiments or examples.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the terms "module," "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

It should be noticed that, the embodiments/examples and the features in the embodiments/examples may be combined with each other in a no conflict condition. This disclosure will become apparent from the following detailed description when taken in conjunction with the accompanying drawings.

It should be noticed that, the steps illustrated in the flowchart of the drawings may be performed in a set of computer device with executable program codes. And the order of the steps may be different from that in the drawings under some status, although a logic order is shown in the flowchart.

Other aspects, features, and advantages of this disclosure will become apparent from the following detailed description when taken in conjunction with the accompanying drawings. Apparently, the examples described thereinafter merely a part of examples of the present disclosure, but not all examples. Persons skilled in the art may obtain all other examples without creative works, based on these examples, which pertains to the protection scope of the present disclosure.

To further elaborate the technical measures taken by and effects provided by the present disclosure for implementing the intended disclosure purpose, the following describes in detail the implementation mode, structure, characteristics, and effects of the present disclosure in combination with drawings and preferred examples.

See FIG. 1. FIG. 1 shows the schematic diagram of application environment of the data transfer method provided by the examples of the present disclosure. The method comprises the client 20, the first node 21, the second node 22, and the destination node 23. Wherein, the first node 21 may be deployed near the client 20.

In the examples of the present disclosure, proxy forwarding modules with the same program may be deployed on the first node 21 and the second node 22. Establishment of a connection between nodes deployed with different proxy forwarding modules consumes system port resources.

Particularly, as along as a persistent connection is maintained, the ports remain occupied. As the number of ports available on a node is limited, the number of nodes needs to be increased in the case of mass concurrent data. In the examples of the present disclosure, proxy forwarding modules with the same program are deployed on the first node 21 and second node 22. Thus, the first node 21 and second node 22 can transfer data according to the same rule, namely, the method provided by the examples of the present disclosure, to converge connections and thereby solving the problem of port resource occupancy. Different proxy forwarding modules may be deployed on the second node 22 and the destination node 23.

The client 20, the first node 21, the second node 22, and the destination node 23 are respectively equipped with a memory, a processor, and a network module. The memory may be used to store software programs and modules, such as the program instructions/modules corresponding to the data transfer method provided by the examples of the present disclosure. The processor executes various functions and data processing by running the software programs and modules stored in the memory; that is, implementing data transfer among the above-mentioned client 20, the first node 21, the second node 22, and the destination node 23.

Data transfer among the client 20, the first node 21, the second node 22, and the destination node 23 is implemented by using a network, such as the Internet, an intranet, and a wireless network.

Client 20 may be a user terminal or a server. The user terminal may be a smartphone, tablet PC, e-book reader, Moving Picture Experts Group Audio Layer III (MP3) player, Moving Picture Experts Group Audio Layer IV (MP4) player, laptop computer, or a vehicle-mounted terminal.

Figure 2:
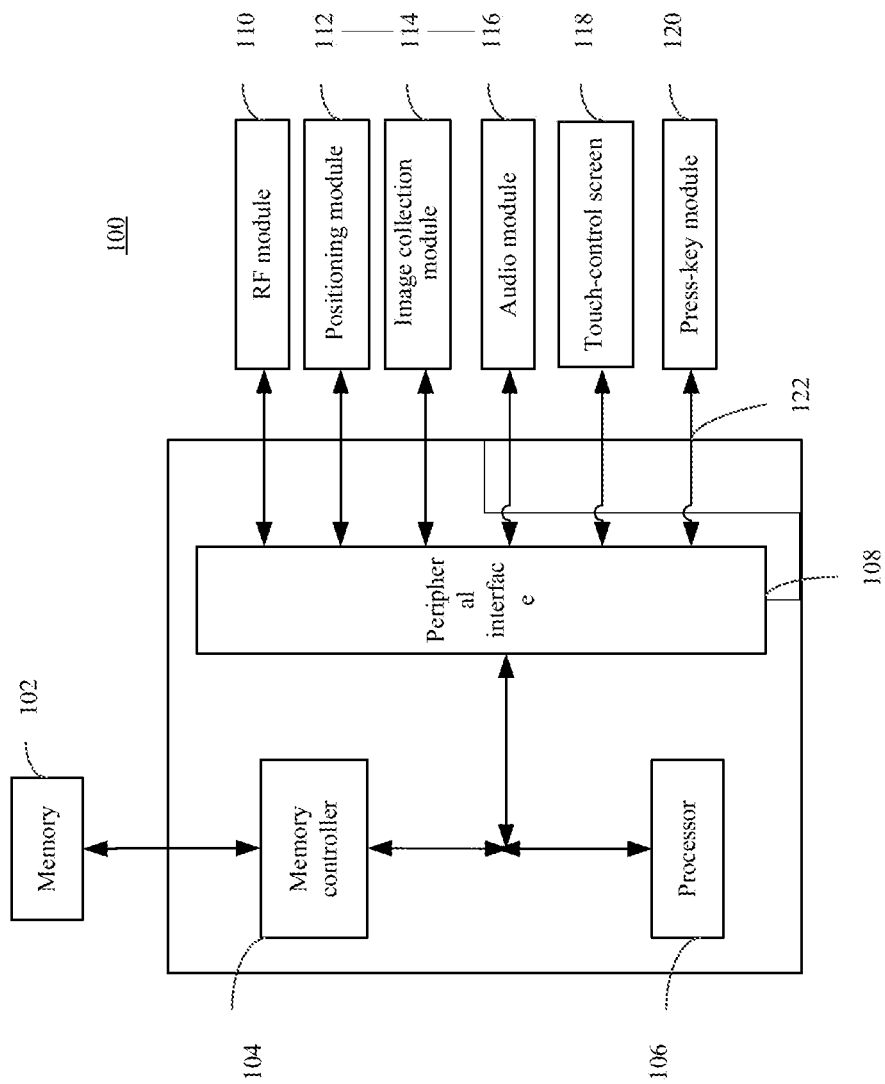
FIG. 2 shows the structural diagram of a user terminal that may be used in the examples of the present disclosure.

FIG. 2 shows the structural diagram for a user terminal that may be used in the examples of the present disclosure. As shown in FIG. 2, the user terminal 100 comprises the memory 102, the storage controller 104, one or more processors 106 (only one processor shown in the figure), the peripheral interface 108, the RF module 110, the positioning module 112, the image collection module 114, the audio module 116, the touch-control module 118, and the press-key module 120. These components communicate with one another by using one or more communication buses/signal lines 122.

It may be understood that the structure as shown in FIG. 2 is only schematic. The user terminal 100 can also comprise more or less components than those as shown in FIG. 2 or components with configurations different from those as shown in FIG. 2. The components as shown in FIG. 2 may be implemented by using hardware, software, or a combination of hardware and software.

The memory 102 may be used to store software programs and modules, such as the program instructions/modules corresponding to the data transfer method and device described in the examples of the present disclosure. The processor 102 executes various functions and data processing by running the software programs and modules stored in the memory 104, for example, the data transfer method provided by the examples of the present disclosure.

The memory 102 can comprise a high-speed Random-Access Memory (RAM) and a nonvolatile memory, for example, one or more magnetic memory devices, flash memory, or any other nonvolatile solid memory. In certain examples, the memory 102 can further comprise memories set remotely relative to the processor 106. These remote memories may be connected to the user terminal 100 by using a network. The above-mentioned networks include, but are not limited to, the Internet, intranets, local area networks (LANs), mobile communications networks, and a combination of them. The processor 106 and other possible components can access the memory 102 under the control of the storage controller 104.

The peripheral interface 108 couples various kinds of input/output devices to the CPU and the memory 102. The processor 106 runs the software programs and instructions stored in the memory 102 to execute the functions of the user terminal 100 and perform data processing.

In certain examples, the peripheral interface 108, the processor 106, and the storage controller 104 may be implemented using a single chip. In some other examples, the above-mentioned modules may be implemented respectively using an independent chip.

The RF module 110 is used to receive and send electromagnetic waves and complete conversion between electromagnetic waves and electrical signals, thereby communicating with communications network or other devices. The RF module 110 can comprise a variety of existing circuit components used to execute these functions. Such circuit components include antennas, RF transceivers, digital signal processors, encryption/decryption chips, subscriber identity modules (SIMs), and memories.

The RF module 110 can communicate with a variety of networks, such as the Internet, intranets, and wireless networks or communicate with other devices by using wireless networks. The above-mentioned wireless networks can include cellular phone networks, LANs, and metropolitan area networks (MANs).

The above-mentioned wireless networks can adopt a variety of communications standards, protocols, and technologies, including, but not limited to, Global System for Mobile Communication (GSM), (Enhanced Data GSM Environment, EDGE), Wideband Code Division Multiple Access (W-CDMA), Code division Multiple Access (CDMA), Time Division Multiple Access (TDMA), Bluetooth, Wireless Fidelity (WiFi) (such as IEEE 802.11a, IEEE 802.11b, IEEE802.11g, and/or IEEE 802.11n), Voice over Internet Protocol (VoIP), Worldwide Interoperability for Microwave Access (Wi-Max), other protocols used for Emails, instant messaging, and short messages, any other applicable communications protocols, and even the protocols still under development.

The positioning module 112 is used to obtain the information about the current location of the user terminal 100. Examples of the positioning module 112 include, but are not limited to, the Global Positioning System (GPS) and positioning technologies based on wireless LANs or mobile communications networks.

The image collection module 114 is used to take photos and videos. Taken photos or videos may be stored in the memory 102 and sent by using the RF module 110.

The audio module 116 provides audio interfaces, including one or more microphones, one or more loudspeakers, and audio circuit. The audio circuit receives audio data from the peripheral interface 108, converts the audio data into electric signals, and then sends the electric signals to the loudspeaker.

The loudspeaker converts the electric signals into audible sound waves. The audio circuit further receives electric signals from a microphone, converts the electric signals into audio data, and transfers the audio data to the peripheral interface 108 for further processing. Audio data may be obtained from the memory 102 or by using the RF module 110. In addition, audio data can also be stored in the memory 102 or sent by using the RF module 110. In certain examples, the audio module 116 can further comprise a headset jack used to provide an audio interface for headsets and other devices.

The touch-control screen 118 concurrently provides an output/input interface between the user terminal 100 and the user. Specifically, the touch-control screen 118 displays visual output to the user. Such visual output may be text, graphics, videos, or a combination of them. Certain output results correspond to certain user interface objects. The touch-control screen 118 further receives a user input, such as clicking, sliding, and other hand operations, allowing user interface objects to respond to such user input. The technology used to detect the user input may be a resistance touch-control detection technology, a capacitance touch-control detection technology, or any other possible touch-control detection technology. Examples of the display unit of the touch-control screen 118 include, but are not limited to, liquid crystal displays (LCDs) and luminescence polymer displays.

The press-key module 120 also provides an interface on which the user can input data into the user terminal 100. When the user presses a key, the user terminal 100 performs the corresponding function.

Figure 3:
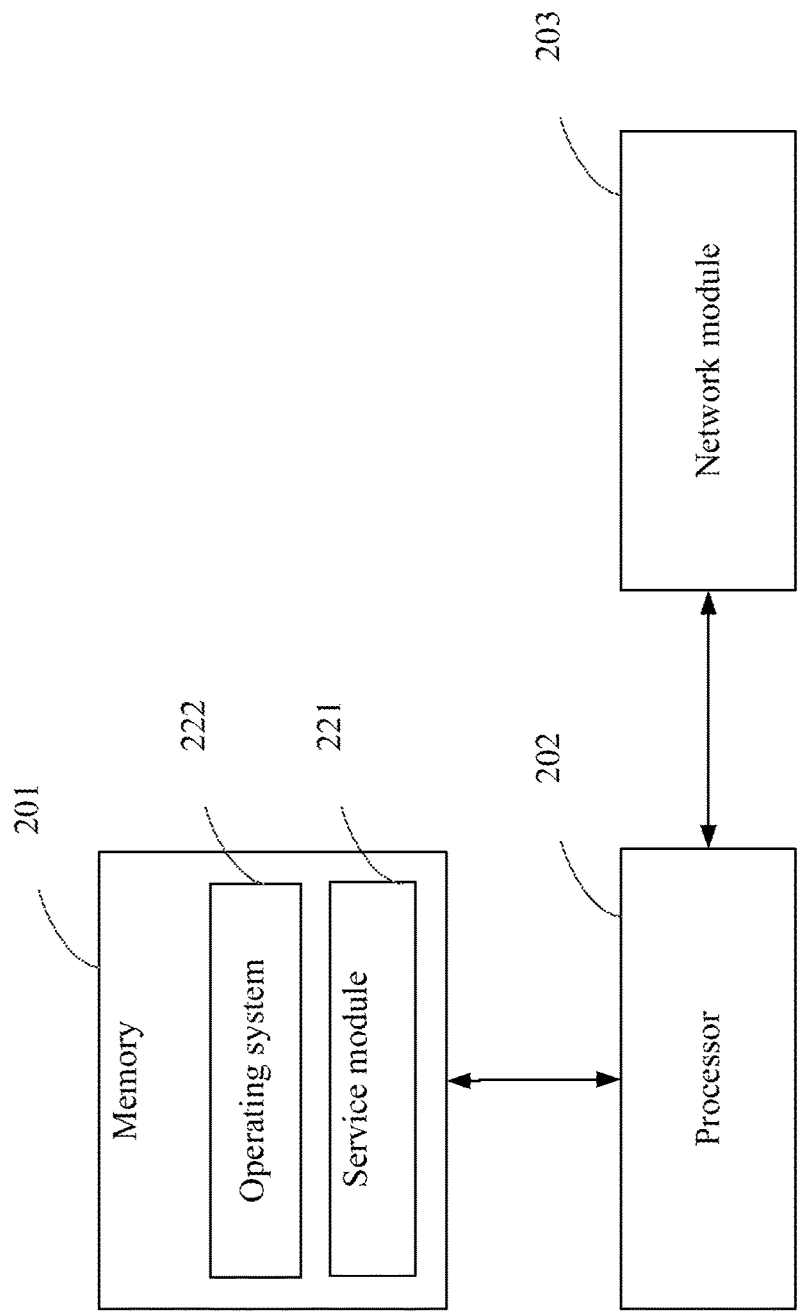
FIG. 3 shows the structural diagram of a server provided by the examples of the present disclosure.

FIG. 3 shows the structural diagram for a server used for the client, first node, second node, or destination node described in the examples of the present disclosure. As shown in FIG. 3, the server 200 comprises the memory 201, the processor 202, and the network module 203. It may be understood that the structure as shown in FIG. 3 is only schematic and does not limit the structure of the first node 21, the second node 22, or the destination node 23. For example, the first node 21, the second node 22, and the destination node 23 further can comprise more or less components than those as shown in FIG. 3 or components with configurations different from those as shown in FIG. 3.

The memory 201 may be used to store software programs and modules, such as the program instructions/modules corresponding to the image display method and device described in the examples of the present disclosure. The processor 202 executes various functions and data processing by running the software programs and modules stored in the memory 201, for example, implementing the identity verification method provided by the examples of the present disclosure. The memory 201 can comprise a high-speed RAM and a nonvolatile memory, for example, one or more magnetic memory devices, flash memory, or any other nonvolatile solid memory.

In certain examples, the memory 201 can further comprise memories set remotely relative to the processor 202. These remote memories may be connected to the server 200 by using a network. Further, the above-mentioned software programs and modules can comprise: the operating system 221 and the service module 222. Wherein, the operating system 221 may be Linux, Unix, or Windows, which can comprise various kinds of software components and/or drivers used to manage system tasks (such as memory management, storage device control, and power management) and can communicate with hardware or software components, thereby improving the running environments of other software components.

Running based on the operating system 221, the service module 222 listens on requests from networks by using the network services provided by the operating system 221, completes the corresponding data processing, and returns the processing results to the user terminal. That is, the service module 221 can used to provide network services for the user terminal.

The network module 203 may be used to receive and send network signals. The above-mentioned signals can include wireless signals and wired signals. In an example, the above-mentioned network signals are wired network signals. In this case, the network module 203 can comprise components such as the processor, RAM, converter, and crystal oscillator.

The above-mentioned software programs and modules further comprise operating systems, including Linux, Unix, and Windows, which can comprise various kinds of software components and/or drivers used to manage system tasks (such as memory management, storage device control, and power management) and can communicate with hardware or software components, thereby improving the running environments of other software components. In the examples of the present disclosure, a variety of Transmission Control Protocol (TCP) application programs may be in different operating systems.

Figure 4:
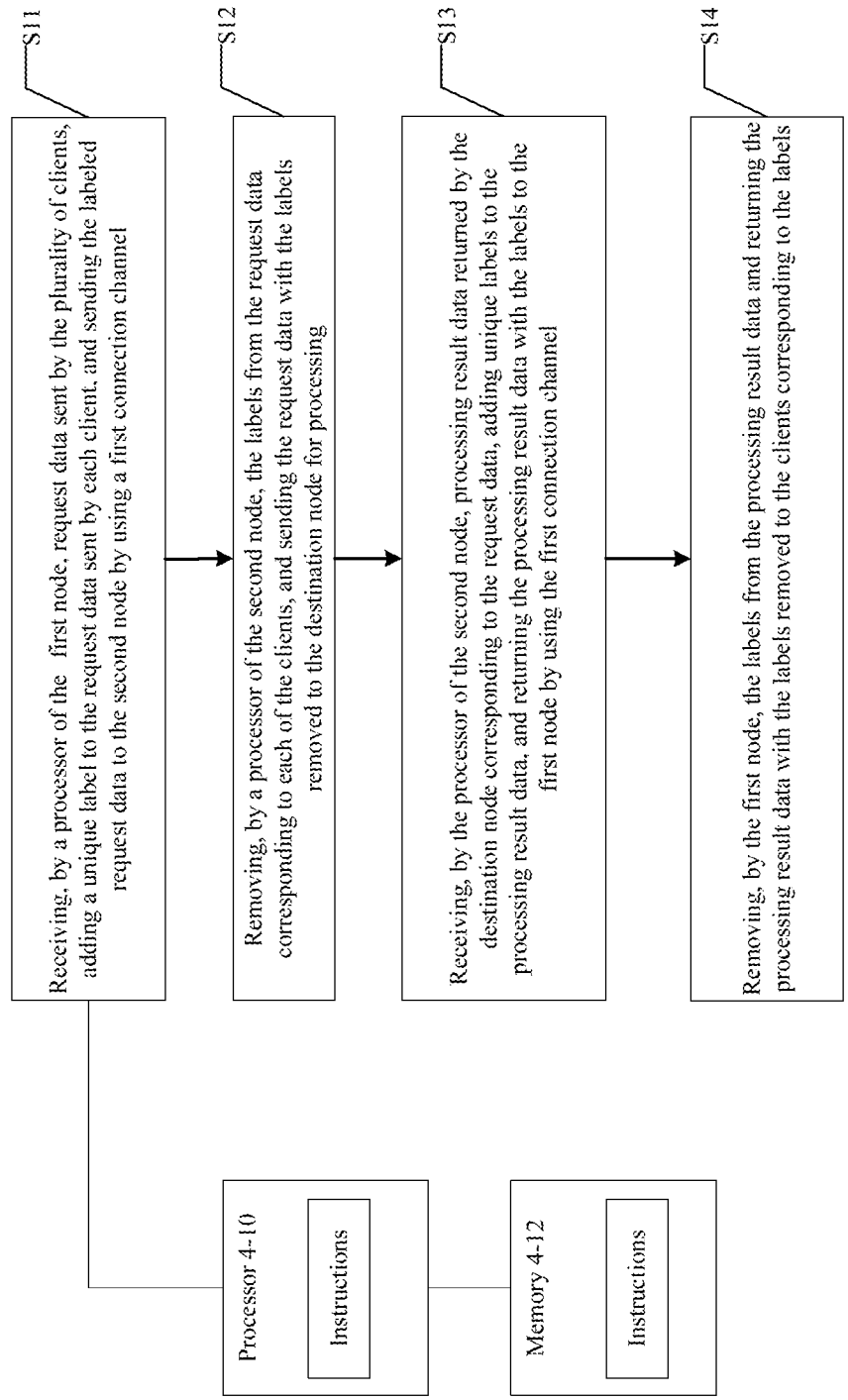
FIG. 4 shows the flowchart of a data transfer method provided by an example of the present disclosure.

FIG. 4 shows the flowchart of the data transfer method provided by an example of the present disclosure. Steps shown in FIG. 4 may be performed by one or more processors 4-10 to execute instructions stored in memory 4-12. As shown in FIG. 4, the data transfer method provided by the present example comprises the following steps:

Step S11: Receiving, by a processor of the first node, request data sent by the plurality of clients, adding a unique label to the request data sent by each client, and sending the labeled request data to the second node by using a first connection channel.

Request data is sourced from clients to obtain preset services, including user accounts corresponding to clients. Data to be processing contains numerical contents, service identifiers, and destination node identifier. The first node receives in real time the request data sent by clients and forwards the received request data to the destination node.

Figure 5:
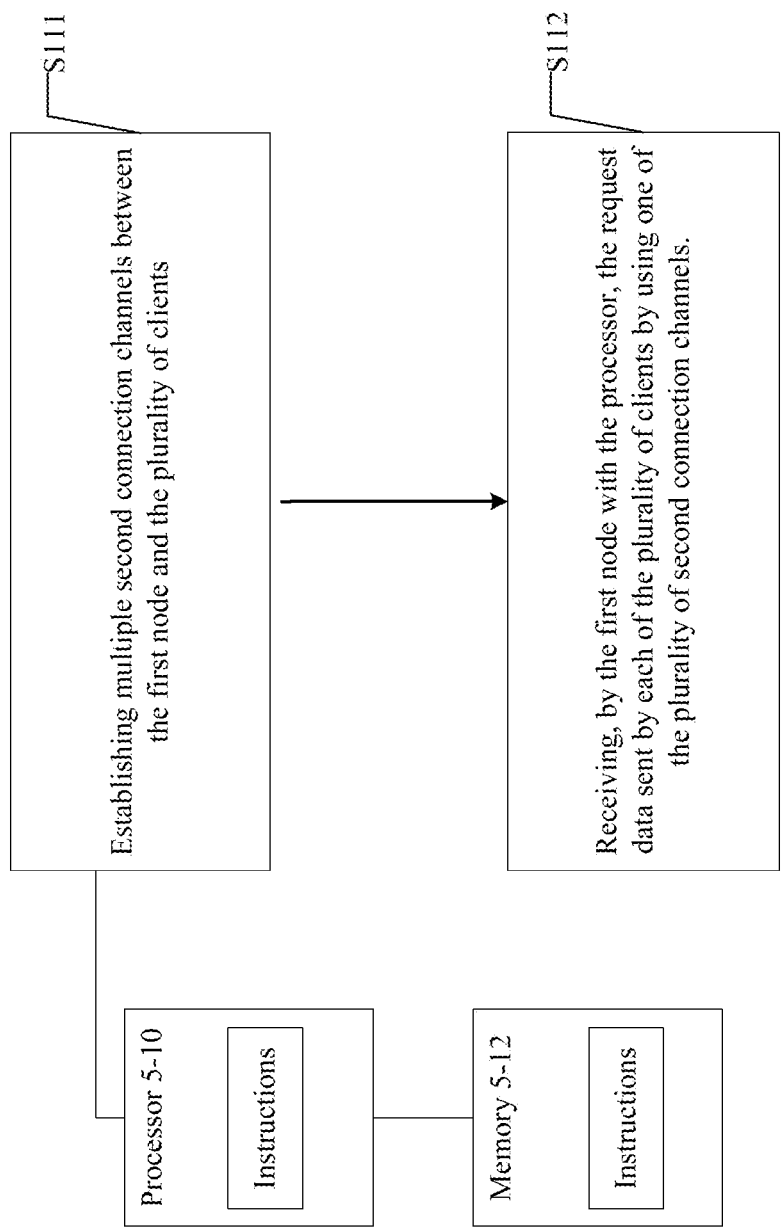
FIG. 5 is a flowchart showing the steps of the first node for receiving the request data sent by the multiple clients as shown in FIG. 4.

As shown in FIG. 5, specifically, the flow by which the first node receives the request data sent by the multiple clients can comprise:

S111: Establishing a plurality of second connection channels between the first node and the plurality of clients.

S112: Receiving, by the first node with the processor, the request data sent by each of the plurality of clients by using one of the plurality of second connection channels.

Steps shown in FIG. 5 may be performed by one or more processors 5-10 to execute instructions stored in memory 5-12.

The multiple second connection channels established between the first node and the multiple clients may be persistent connection channels or non-persistent connection channels.

Specifically, such connections may be TCP persistent connections and/or TCP non-persistent connections. That is, the multiple second connection channels established between the first node and multiple clients may be all TCP persistent connections, all TCP non-persistent connections, or partly TCP persistent connections and partly TCP non-persistent connections.

In the case TCP is used for network communication, before a read or write operation is actually performed, a connection must be established between the server and a client. When a read/write operation is completed and the connection is no longer needed, the connection may be released.

Persistent connection refers to a connection mode in which a client initiates a connection request to the server; the server accepts the connection request sent by the client so that a connection is established between the server and the client; after completion of a read/write operation between the client and server, the connection between them is not removed unrequested, but will continue for use by subsequent read/write operations.

As opposed to a persistent connection, a non-persistent connection typically is used for transferring one read/write operation between a client and a server. That is, a connection is established between the client and the server only when they interact for packet exchange, and the connection is removed upon completion of the interaction.

On receiving the request data sent by the multiple clients, the first node adds the corresponding label (seq) to the request data sent by each client. The label (seq) is unique across the network. For each client, a label (seq) is generated when a connection is established between the client and the first node. The first node records the correspondence between the client and the label (seq). Thus, the label (seq) may be used for any request data transferred using that connection.

However, if the connection to the client is broken, the label (seq) also becomes invalid. When a connection is established between the client and the first node next time, a new label (seq) is generated. The label (seq) may be a character string. Specifically, a scalar may be added as the label (seq) of the client based on the external network IP address of the equipment, or a label may be requested from and uniformly managed by the global management module (master).

Alternatively, other methods of generating label may be used, as long as a generated label is globally unique. The examples of the present disclosure do not limit the specific method used to generate label.

The label (seq) may be added as a packet header to the corresponding request data. The packet header can further contain information including a magic sequence number and packet size. The label can also be added to the corresponding request data by using other methods, not limited by the examples of the present disclosure.

The first node sends the pieces of multiple request data with label (seq) added to the second node by using the same first connection channel. If multiple first connection channels are already established between the first node and the second node, the first node can randomly select a first channel for the multiple pieces of request data, and store the selected first connection channel to relevant data corresponding to the client, for example, the state machine of the corresponding client, to record the current state of the client.

The same first connection channel preferably may be a persistent connection channel, for example, a TCP persistent connection. Specifically, a client can send a persistent connection request to the first node; when the first node accepts the request, a persistent connection is established between the client and the first node. Persistent connections established using other protocols, such as the Hyper-Text Transport Protocol, can also be used.

Management of non-persistent connections is relatively simple, and any existing connection is a useful connection, without the need of any additional control measures.

However, non-persistent connections are not applicable in the case of mass concurrent data. The reason is that, a three-way handshake needs to be completed before a non-persistent connection may be established; a four-way handshake needs to be completed before a non-persistent connection may be removed.

If each operation may be performed only after a connection is established, the processing speed is low. If the distance between nodes is long, delay occurs, leading to problems such as congestion, abnormal connection, and connection interruptions.

Therefore, persistent connections are established between the first node and second node to complete data exchange. After a read/write operation is completed, the connection between these nodes is not removed unsolicited. Thus, when mass concurrent data occurs, the problems with non-persistent connections, such as a low processing speed, congestion, abnormal connection, and connection interruptions, may be avoided to improve data transfer stability and efficiency.

Step S12: Removing, by a processor of the second node, the labels from the request data corresponding to each of the clients, and sending the request data with the labels removed to the destination node for processing.

As a label (seq) is globally unique, on receiving request data, the second node can verify the correspondence between the request data and the client based on the label carried by the request data, independent of ports. The second node removes the label (seq) from the request data corresponding to each client and then sends the request data with the label (seq) removed to the destination node, that is, restoring the original request data sent by the client and then sending the data to the destination node. Thus, data transfer may be completed between the second node and the destination node without the need of specially designing the destination node.

Figure 6:
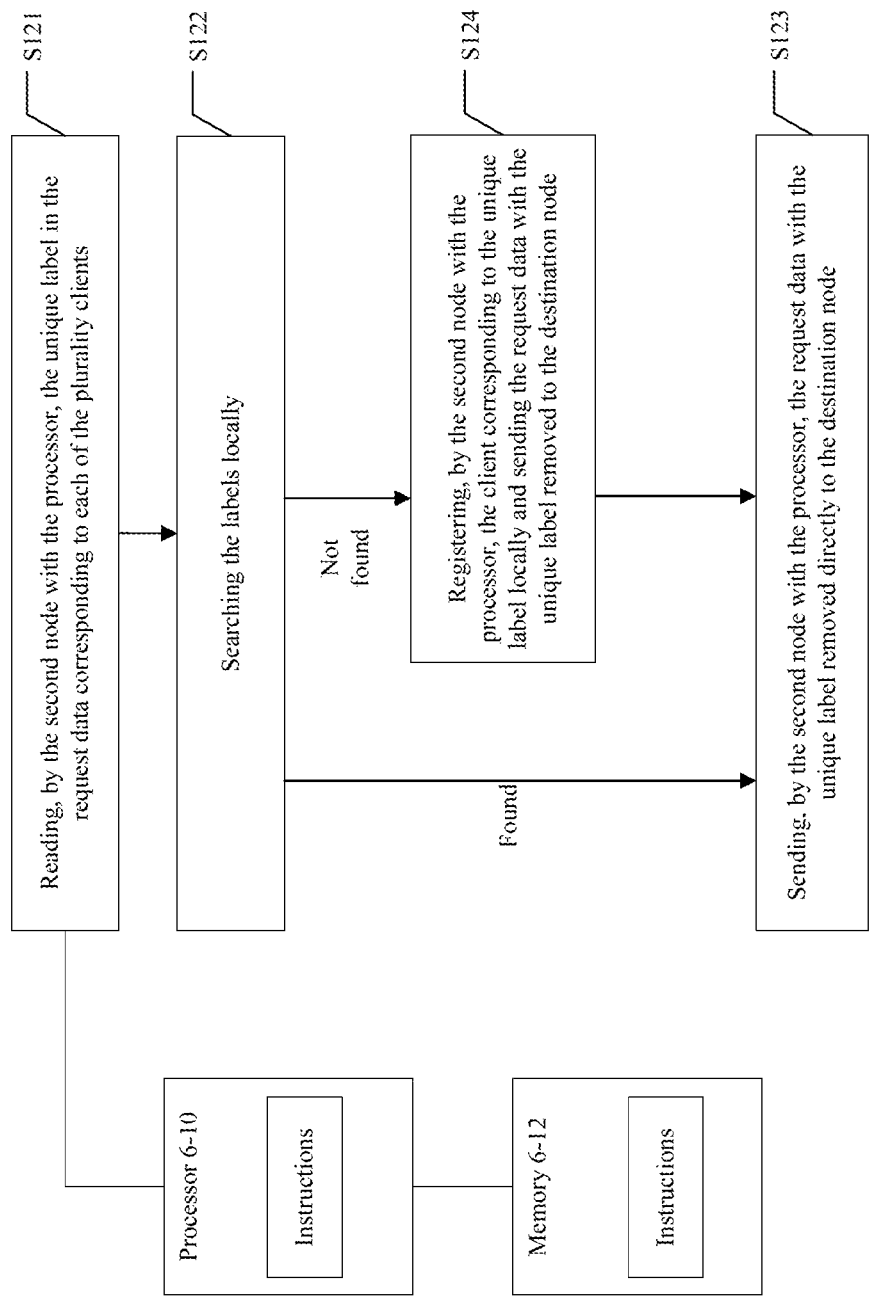
FIG. 6 is a flowchart showing the steps of the second node for removing the label from the request data corresponding to each client and sending the request data with the label removed to the destination node for processing as shown in FIG. 4.

As shown in FIG. 6, specifically, Step S12 can comprise:

Step S121: Reading, by the second node with the processor, the unique label in the request data corresponding to each of the plurality clients.

Step S122: Searching the labels locally, Step S123 is performed, that is, Sending, by the second node with the processor, the request data with the unique label removed directly to the destination node. Step S124 is performed first, that is, Registering, by the second node with the processor, the client corresponding to the unique label locally and sending the request data with the unique label removed to the destination node.

Steps shown in FIG. 6 may be performed by one or more processors 6-10 to execute instructions stored in memory 6-12.

If the second node locally finds the label (seq) corresponding to the client, it indicates that the request sent by the client is from an existing user. In this case, the second node directly removes the request data with the label removed to the destination node.

If the second node fails to find locally the label (seq) corresponding to the client, it indicates that the request sent by the client is from a new user. In this case, the second node locally registers the client based on the label (seq) corresponding to the client.

Specifically, the state machine corresponding to the label (seq), namely, the state machine corresponding to the client, may be generated to record the state of the client. On registration completion, the second node sends the request data with the label (seq) removed to the destination node. When the client sends a request the next time, the second node can process the request as a request from an existing user.

Figure 7:
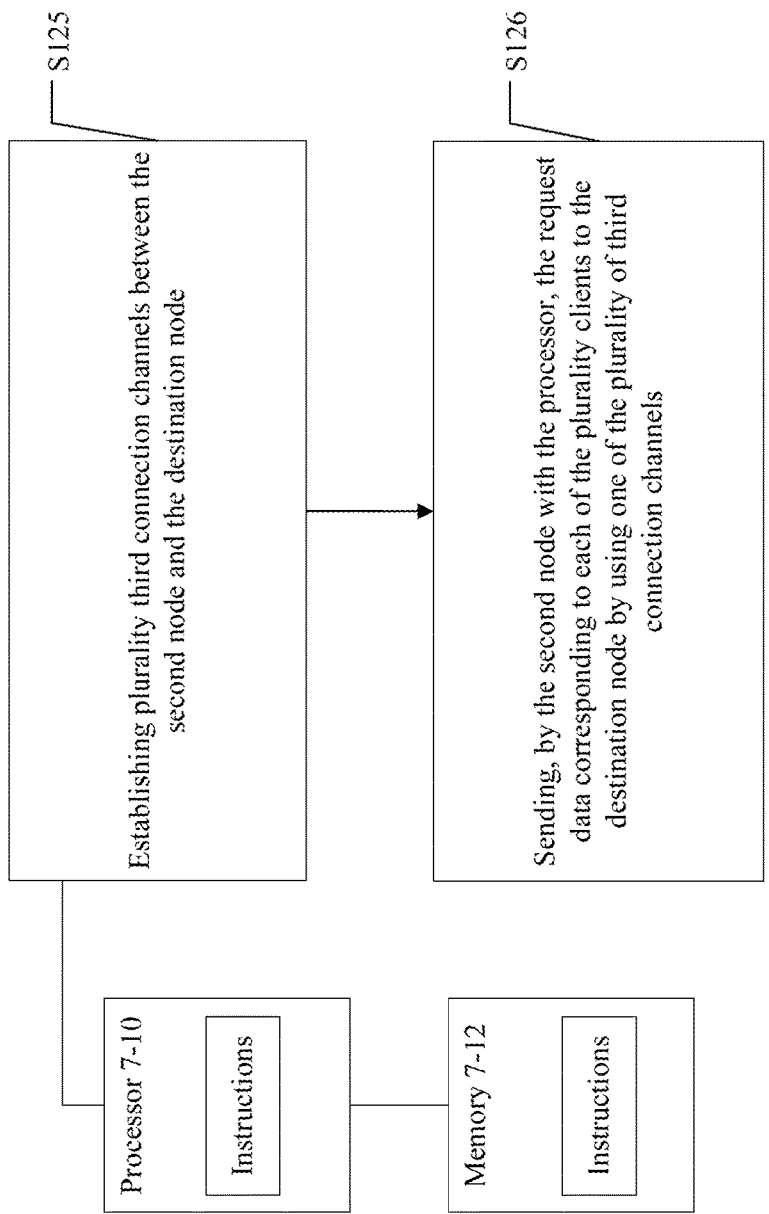
FIG. 7 is a flowchart showing the steps of sending the request data with the label removed to the destination node for processing as shown in FIG. 4.

As shown in FIG. 7, in Step S12, the procedure of sending the request data with the label removed to the destination node can comprise:

Step S125: Establishing plurality third connection channels between the second node and the destination node.

Step S126: Sending, by the second node with the processor, the request data corresponding to each of the plurality clients to the destination node by using one of the plurality of third connection channels.

Steps shown in FIG. 7 may be performed by one or more processors 7-10 to execute instructions stored in memory 7-12.

The multiple third connection channels established between the second node and the destination node may be persistent connection channels or non-persistent connection channels. Specifically, such connections may be TCP persistent connections and/or TCP non-persistent connections. That is, the multiple third connection channels established between the second node and destination node may be all TCP persistent connections, all TCP non-persistent connections, or partly TCP persistent connections and partly TCP non-persistent connections.

Step S13: Receiving, by the processor of the second node, processing result data returned by the destination node corresponding to the request data, adding unique labels to the processing result data, and returning the processing result data with the labels to the first node by using the first connection channel.

The destination node can parse request data to obtain information such as user accounts, data to be processed, and service identifiers and process the data to be processed depending on service types. The examples of the present disclosure do not limit the specific processing method used.

The label may be added as a packet header to the corresponding processing result data. The label can also be added to the corresponding processing result data by using other methods, which is not limited to the examples of the present disclosure.

After adding the corresponding label to each processing result data, the second node returns the processing result data with the label added to the first node by using the first connection channel. Specifically, assume that, by using the same first connection channel L1, the first node sends request data D1, D2, D3 ... Dn to the second node, and the second node, by the first connection channel L1, returns the processing result data R1, R2, R3 ... Rn corresponding to the request data D1, D2, D3 ... Dn to the first node. That is, the second node returns the processing result data to the first node by using the original channel.

Step S14: Removing, by the first node, the labels from the processing result data and returning the processing result data with the labels removed to the clients corresponding to the labels.

On receiving the processing result data, the first node removes the label (seq) from each the processing result data and returns each processing result data with the label (seq) removed respectively to the client corresponding to the label, namely, restoring the processing result data to the original processing data returned by the destination node.

Further, the distance between the first node and the clients is smaller than the first threshold; the distance between the first node and the second node is greater than the second threshold; the distance between the second node and the destination node is smaller than the third threshold; the third threshold is greater than the first threshold and the second threshold.

The first threshold, second threshold, and third threshold may be adjusted according to actual service requirements. Preferably, the first node and clients may be connected for nearby deployment; the first node and second node may be deployed across regions, for example, across countries (or regions).

For example, the first node may be deployed in the United Sates and the second node in China; alternatively, the first node may be deployed in Beijing and the second node in Shenzhen. The second node and destination node may be deployed in the same region or the same equipment room, for example, in the same country (or region).

For example, the second node and destination node are deployed in Shenzhen, or the second node is deployed in Hong Kong and the destination node in Shenzhen. The examples of the present disclosure do not limit the specific deployment mode.

Compared with the prior art, in the present example, the first node, on receiving the request data sent by multiple clients, adds a corresponding label to the request data sent by each client, and sends the labeled request data to the second node by using the same connection channel; the second node removes the label from the request data and sends the unlabeled request data to the destination node for processing.

The second node receives the processing result data returned by the destination node respectively corresponding to each request data, adds the corresponding label to each processing result data, and returns the labeled processing result data to the first node by using the same connection channel; the first node returns the unlabeled processing result data respectively to the client corresponding to the label.

The label corresponding to a client is unique across the network. Therefore, even if the first node sends the request data corresponding to multiple clients to the second node by using the same connection channel, the second node can determine the correspondence between the request data and clients based on the label in the request data.

In addition, the first node can also determine to which client the processing result data should be returned based on the label in the processing result data. Therefore, the data transfer between the first node and second node is port-independent.

Figure 8:
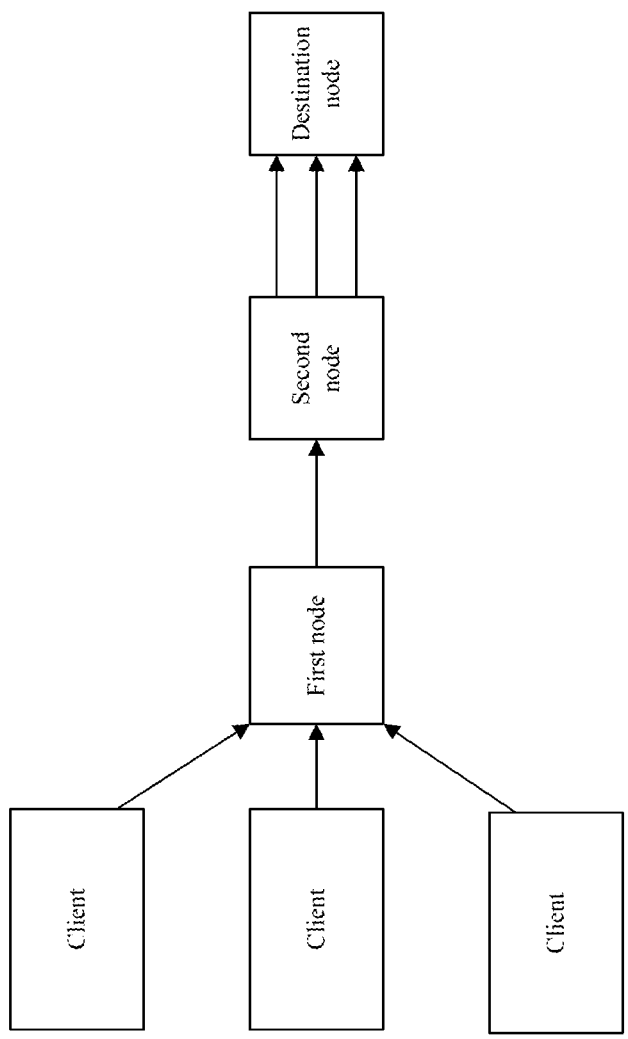
FIG. 8 shows the schematic diagram of converged connection using the data transfer method provided by the examples of the present disclosure.

Multiple requests sent by multiple clients to the first node by using different connections may be sent to the second node by using the same connection. Thus, converged connection (as shown in FIG. 8) is implemented to save port resources, resulting in improved access capacity of the equipment as a single unit and hence reduced costs.

Figure 9:
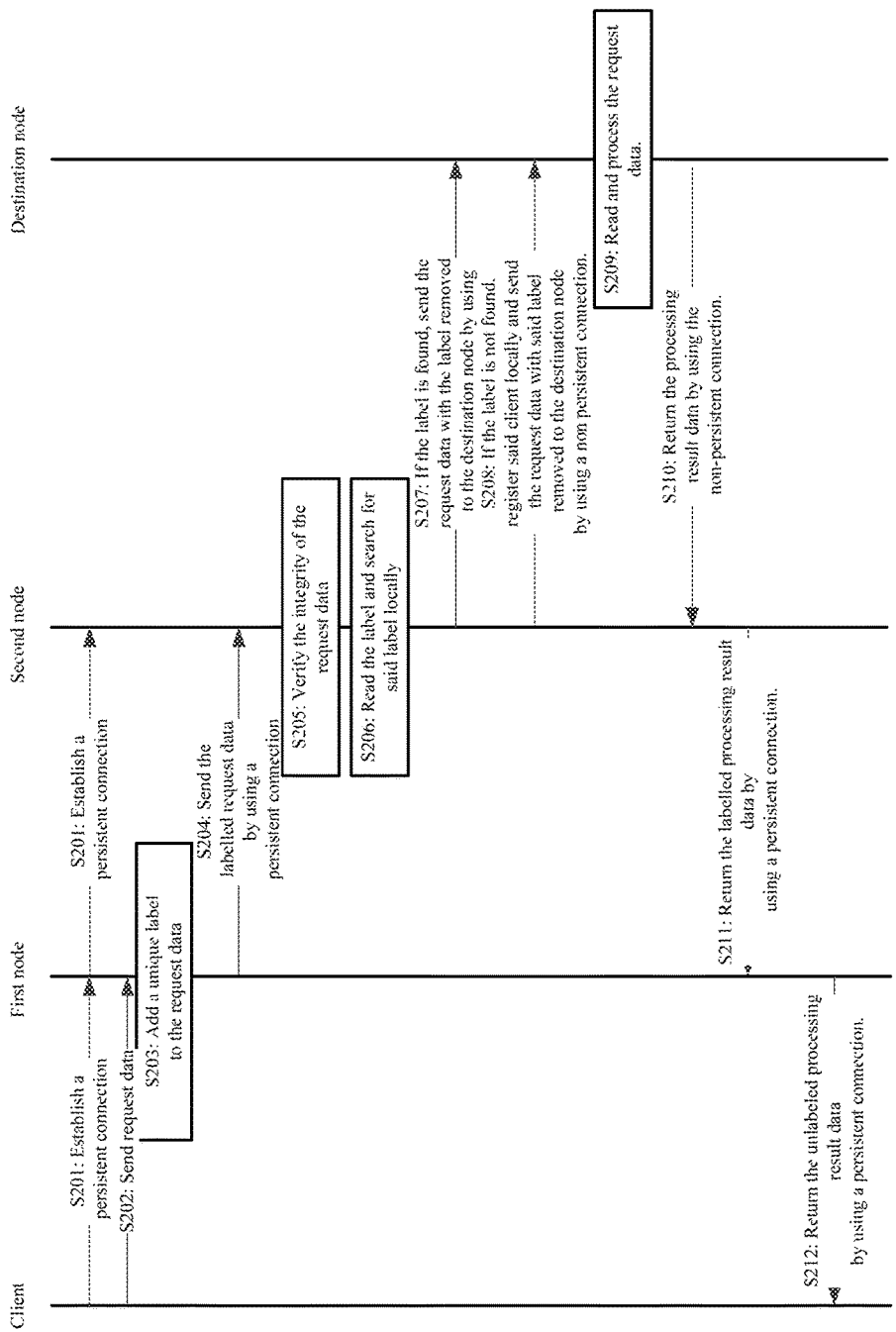
FIG. 9 shows the flowchart of another data transfer method provided by an example of the present disclosure.

FIG. 9 shows the flowchart of another data transfer method provided by an example of the present disclosure. As shown in FIG. 9, the data transfer method provided by the present example comprises the following steps:

Step S201: The first node establishes TCP persistent connections with multiple clients and the second node respectively.

In the present example, TCP persistent connections are established between multiple clients and the first node; TCP persistent connections are also established between the first node and the second node. Data exchange between clients and the first node and between the first node and second node is done through a persistent connection. After a read/write operation is completed, the connection between them is not removed unsolicited. Thus, when there is a mass concurrent data transfer, the problems found with a non-persistent connection, such as low processing speed, congestion, abnormal connection, and connection interruption, may be avoided to improve data transfer stability and efficiency.

In the present example, the first node and the clients are connected for proximity deployment; the first node and second node are deployed across regions; the second node and destination node are deployed in the same region or the same equipment room.

Step S202: The first node receives the request data sent by each client respectively by using the corresponding persistent connections.

Step S203: The first node adds the corresponding label to the request data sent by each client.

In the present example, the label may be added to the packet header of the corresponding request data. The packet header can further contain information including a magic sequence number and packet size.

Step S204: The first node sends the labeled request data to the second node by using the same persistent connection;

Step S205: The second node verifies the integrity of the request data, and if the verification is successful, Step S206 is performed.

For example, whether the magic sequence number in the packet header complies with protocol specifications is checked; then, whether the size of the received data is the same as the data size specified in the packet header is checked. As multiple types of packets may be available, there may be multiple different magic sequence numbers. Other methods for verifying data integrity can also be used, which is not limited to the examples of the present disclosure.

Step S206: The second node reads the label in the request data corresponding to each client and searches the label locally, and if the label is found, Step S207 is performed; otherwise, Step 208 is performed.

Step S207: By using a TCP non-persistent connection, the second node directly sends the request data with the label removed to the destination node.

Step S208: The second node locally registers the client, and, by using a TCP non-persistent connection, sends the request data with the label removed to the destination node.

In the present example, a TCP non-persistent connection is established between the second node and the destination node, and the second node sends the request data to the destination node by using the established non-persistent connection. Using non-persistent connections can save port resources of the equipment. In addition, the second node and destination node are often deployed in the same region or on the same network. Therefore, the mutual access delay due to establishment of a non-persistent connection between the second node and the destination node is negligible. In addition, it can fully benefit from simple management of a non-persistent connection, no waste of any existing connection, and no need for any additional controls.

Step S209: The destination node receives the request data by using a non-persistent connection and processes it.

Step S210: The destination node returns the processing result data to the second node by using the corresponding non-persistent connection.

Assume that the second node sends the request data D1 to the destination node by using the non-persistent connection S1 and sends the request data D2 to the destination node by using the non-persistent connection S2. In this case, the destination node returns the processing result data R1 to the second node by using the non-persistent connection S1, and returns the processing result data R2 to the second node by using the non-persistent connection S2. That is, the destination node returns the processing result to the second node by using the original channel.

Step S211: The second node receives the processing result data returned by the destination node respectively corresponding to each request data, adds the corresponding label to each processing result data, and returns the labeled processing result data to the first node by using the same persistent connection.

Step S212: The first node removes the label from each processing result data and returns each processing result data with the label removed respectively to the client corresponding to the label.

Further, the first node, second node, and destination node each can include a parameter adjustment module. The parameter adjustment modules are respectively used to adjust the system TCP parameters in the first node, second node, and destination node.

Specifically, parameters including ip_local_port_range, nf_conntrack_max, tcp_max_syn_backlog, tcp_max_syn_backlog, tcp_max_orphans, file-max and nr_open, max_user_watches, tcp_wmem and tcp_mem, rmem_max, wmem_max, sg and gso may be adjusted.

Wherein, the parameter ip_local_port_range limits the total number of ports that application programs can use when the server sends requests to other servers as a client using TCP in the kernel. This value is stored in the kernel by using the unsigned short type. When a certain number of ports are reserved in the kernel, this parameter may be set to its maximum value.

The nf_conntrack_max parameter specifies the maximum number of connections that a firewall tracks. Generally, with the firewall enabled, after the corresponding rule is configured, the state of each connection is recorded in the conntrack file in the kernel. If the value of this parameter is too small, it can result in failure of subsequent attempts to track a connection and also adverse effect on connection establishment; if the value of this parameter is too large, it can result in a very slow search during connection tracking and also adverse effect on connection establishment.

Generally, the formula CONNTRACK_MAX=RAIVISIZE (in bytes)/16384/(computer digit number/32) may be used to calculate the value to which this parameter should be set. However, unless otherwise restricted by other additional rules, the conntrack module of the firewall may be uninstalled from a server with high concurrent connections.

The parameter tcp_max_syn_backlog is used to control the semi-connection queue formed during connection establishment. A semi-connection queue is jointly determined by the parameters tcp_max_syn_backlog, somaxconn, and backlog. The value of backlog may be increased and then somaxconn and tcp_max_syn_backlog used to fine tune the semi-connection queue. A TCP semi-connection queue decides the number of concurrent connections accepted. This parameter is very useful in the case of high concurrent connections.

For example, in the case of 8 GB memory, if the number of connections is large, backlog may be set to within the range of 100 W to 250 W. Generally, in the case backlog is set to 250 W and somaxconn to 1024, if the kernel displays the prompt "syn_flooding" or the value of the system kernel parameter TcpExtListenDrops increases after the system starts running, the value of somaxconn may be multiplied by 2.

The parameter tcp_syncookies is used to specify whether the syncookies function is enabled in the kernel. In the case of large concurrent connections, the syncookies function is also very helpful to the concurrent access capacity of the system. Therefore, it is advisable to enable the syncookies function.

The parameter tcp_max_orphans is used to specify the maximum number of connections that do not belong to a process (for example, a connection removed by a process but in the timewait state). Large concurrent connections inevitably are associated with vast connection establishment and closing. This value may be increased properly based on the actual conditions. The value of tcp_max_orphans may be set to about four times the actual maximum number of connections. For example, the value may be set to be in the range 100 W to 250 W.

The parameter file-max specifies the maximum number of files that may be opened in the system. The parameter nr_open specifies the maximum number of files that may be opened by a single process. These two parameters can also be set to values larger than the number of connections that a single unit needs to support.

In addition, the parameters hard nofile and soft nofile can also be set as needed; these two parameters also specify the maximum number of files that may be opened by a single process.

If epoll is used to listen on such events, the maximum number of files on which epoll can listen can also be set to a large value. Preferably, the parameter max_user_watches may be set to a value equal to that of the parameter file-max.

In addition, the parameter min_epoll_wait_time may be set to 1, in ms, to ensure that epoll can refresh the cached data in time.

The parameters tcp_wmem, tcp_rmem, rmem_max, and wmem_max are memory-related and may be set according to the characteristics of actual request packets.

The features sg and gso may be used to improve the performance of a network interface card (NIC) when the NIC processes large packets, but these features occupy certain amounts of memory. These features may be enabled or disabled based on the actual conditions.

The above-mentioned process of adjusting the system TCP parameters of the first node and the second node may maximally improve the single-unit access capacity of the server.

Compared with the existing art, in the present example, the first node, on receiving the request data sent by multiple clients, adds the corresponding label to the request data sent by each client, and sends the labeled request data to the second node by using the same connection channel; the second node removes the label from the request data and sends the unlabeled request data to the destination node for processing.

The second node receives the processing result data returned by the destination node respectively corresponding to each request data, adds the corresponding label to each processing result data, and returns the labeled processing result data to the first node by using the same connection channel; the first node returns the unlabeled processing result data respectively to the client corresponding to the label. The label corresponding to a client is unique across the network.

Therefore, even if the first node sends the request data corresponding to multiple clients to the second node by using the same connection channel, the second node can determine the correspondence between the request data and clients based on the label in the request data.

In addition, the first node can also determine to which client the processing result data should be returned based on the label in the processing result data. Therefore, the data transfer between the first node and second node is port-independent. Multiple requests sent by multiple clients to the first node by using different connections may be sent to the second node by using the same connection. Thus, converged connection is implemented to save port resources, thereby improving the access capacity of the equipment as a single unit and reducing costs.

Figure 10:
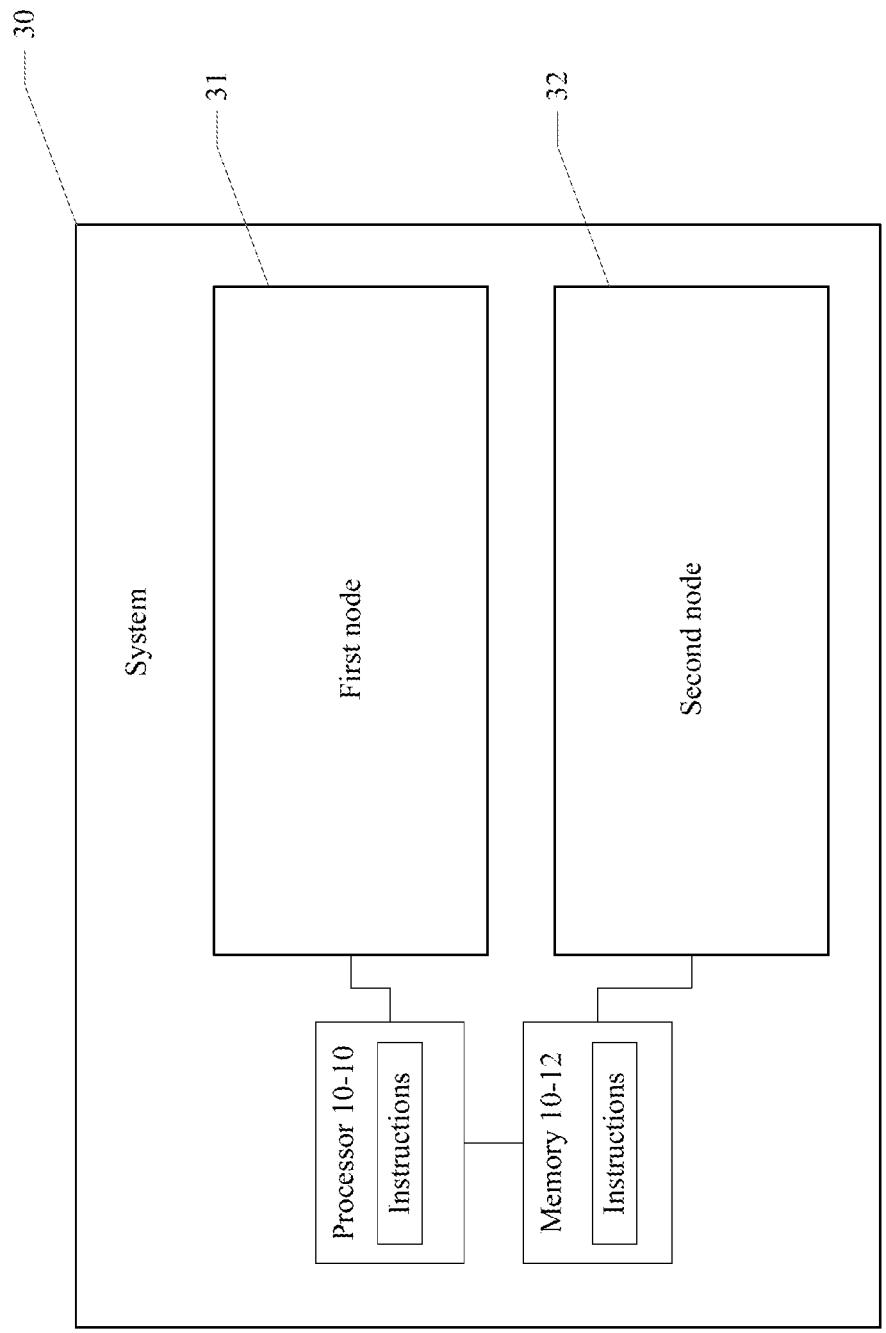
FIG. 10 shows the structural diagram of a system for the data transfer method provided by an example of the present disclosure.

FIG. 10 shows the structural diagram of a system for the data transfer method provided by an example of the present disclosure. As shown in FIG. 10, the data transfer system 30 is configured between multiple clients and the destination node, and comprises a first node 31 and a second node 32. Each node in FIG. 10 may have one or more processors 10-10 that execute instructions that are stored in the memory 10-12.

The first node 31 is used to receive the request data sent by the multiple clients, add the corresponding label to the request data sent by each client, and send the labeled request data to the second node 32 by using the first connection channel;

The second node 32 is used to remove the label from the request data corresponding to each client, and send the request data with the label removed to the destination node for processing;

The second node 32 is also used to receive the processing result data returned by the destination node respectively corresponding to each of the request data, add the corresponding label to each processing result data, and return the processing result data with the label to the first node 31 by using the first connection channel;

The first node 31 is used to remove the label from each of the processing result data and return each processing result data with the label removed respectively to the client corresponding to the label.

The second node 32 may be further used to read the label in the request data corresponding to each clients and search for the label locally, if the label is found, to directly send the request data with the label removed to the destination node, and if the label is not found, to locally register the client corresponding to the label and then send the request data with the label removed to the destination node. The second node 32 may be further used to verify the integrity of the request data.

Figure 11:
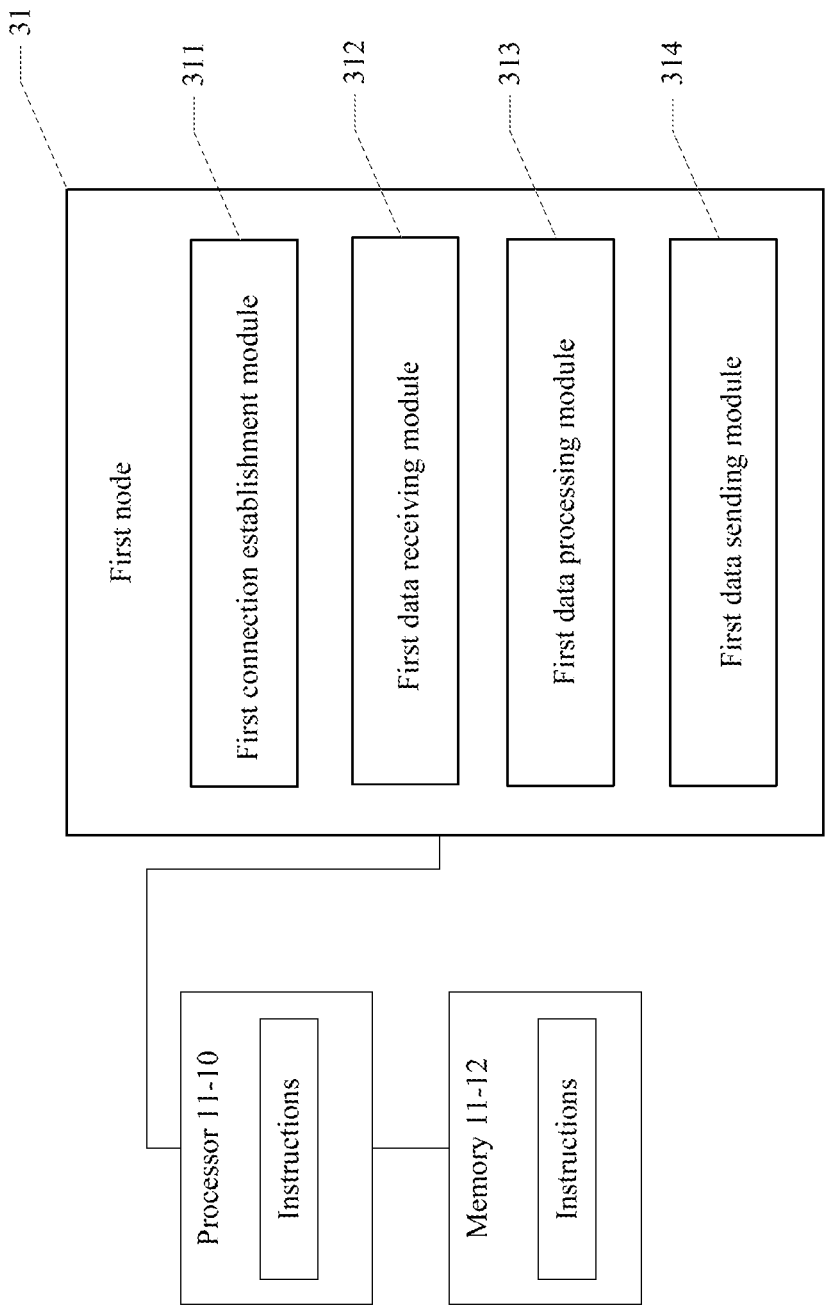
FIG. 11 shows the structural diagram of the first node as shown in FIG. 10.

As shown in FIG. 11, each module of the first node 31 may associate with one or more processors 11-10 that execute instructions that are stored in the memory 11-12. The first node 31 may comprise:

A first connection establishment module 311, used to establish the first connection channel with the second node and establish multiple second connection channels respectively with the multiple clients;

A first data receiving module 312, used to respectively receive the request data sent by each of the clients by using the corresponding second connection channels, and, by using the first connection channel, to receive the processing result data returned by the second node;

A first data processing module 313, used to add the corresponding label to the request data sent by each client and remove the label from each of the processing result data;

A first data sending module 314, used to send the labeled request data to the second node by using the first connection channel, and return each processing result data with the label removed respectively to the client corresponding to the label.

Figure 12:
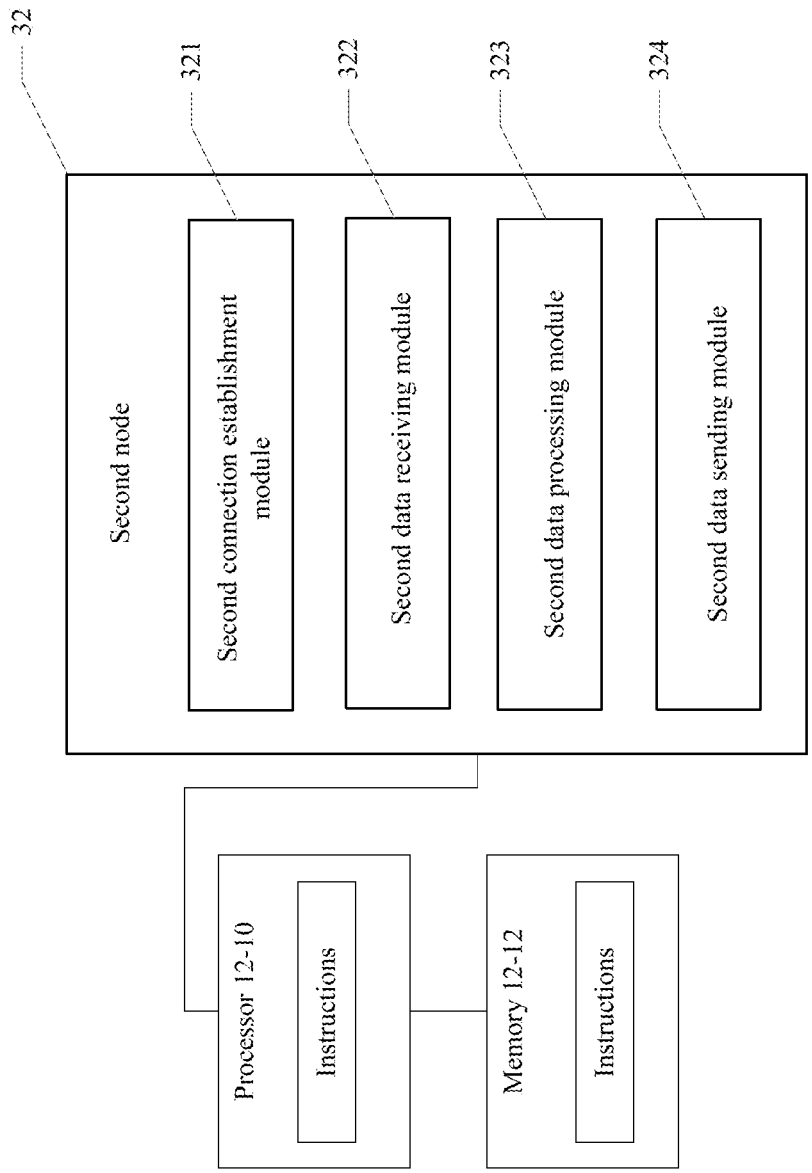
FIG. 12 shows the structural diagram of the second node as shown in FIG. 10.

As shown in FIG. 12, each module of the second node 32 may associate with one or more processors 21-10 that execute instructions that are stored in the memory 21-12. The second node 32 may comprise:

A second connection establishment module 321, used to establish the first connection channel with the first node and establish multiple third connection channels with the destination node;

A second data receiving module 322, used to, by using the first connection channel, receive the labeled request data sent by the first node, and receive the processing result data returned by the multiple third connection channels that respectively correspond to each of the request data;

A second data processing module 323, used to remove the label in the request data corresponding to each client, and add the corresponding label to each processing result data;

A second data sending module 324, used to send the request data corresponding to each of the clients respectively to the destination node by using the corresponding third connection channel, and return the processing result data with the label to the first node by using the same the first connection channel.

The same the first connection channel may be a TCP persistent connection.

The multiple second connection channels established between the first node 31 and the multiple clients may be TCP persistent connections and/or TCP non-persistent connections.

The distance between the first node 31 and the clients is smaller than the first threshold; the distance between the first node 31 and the second node 32 is greater than the second threshold; the distance between the second node 32 and the destination node is smaller than the third threshold; the third threshold is greater than the first threshold and the second threshold.

All of the above-mentioned modules may be implemented using software codes as instructions. In this case, the above-mentioned modules may be stored in the memories of each server. The above-mentioned modules may also be implemented by using hardware, such as chips. In addition, the modules may be combined according to the actual needs.

Note that the function modules of the present example may be implemented according to the methods described in the above-mentioned example. For details about implementation, see the description of the above-mentioned example.

Compared with the prior art, in the present example, the first node, on receiving the request data sent by multiple clients, adds the corresponding label to the request data sent by each client, and sends the labeled request data to the second node by using the same connection channel; the second node removes the label from the request data and sends the unlabeled request data to the destination node for processing.

The second node receives the processing result data returned by the destination node respectively corresponding to each request data, adds the corresponding label to each processing result data, and returns the labeled processing result data to the first node by using the same connection channel; the first node returns the unlabeled processing result data respectively to the client corresponding to the label. The label corresponding to a client is unique across the network.

Therefore, even if the first node sends the request data corresponding to multiple clients to the second node by using the same connection channel, the second node can determine the correspondence between the request data and clients based on the label in the request data. In addition, the first node can also determine to which client the processing result data should be returned based on the label in the processing result data. Therefore, the data transfer between the first node and second node is port-independent. Multiple requests sent by multiple clients to the first node by using different connections may be sent to the second node by using the same connection. Thus, converged connection is implemented to save port resources, thereby improving the access capacity of the equipment as a single unit and reducing costs.

Figure 13:
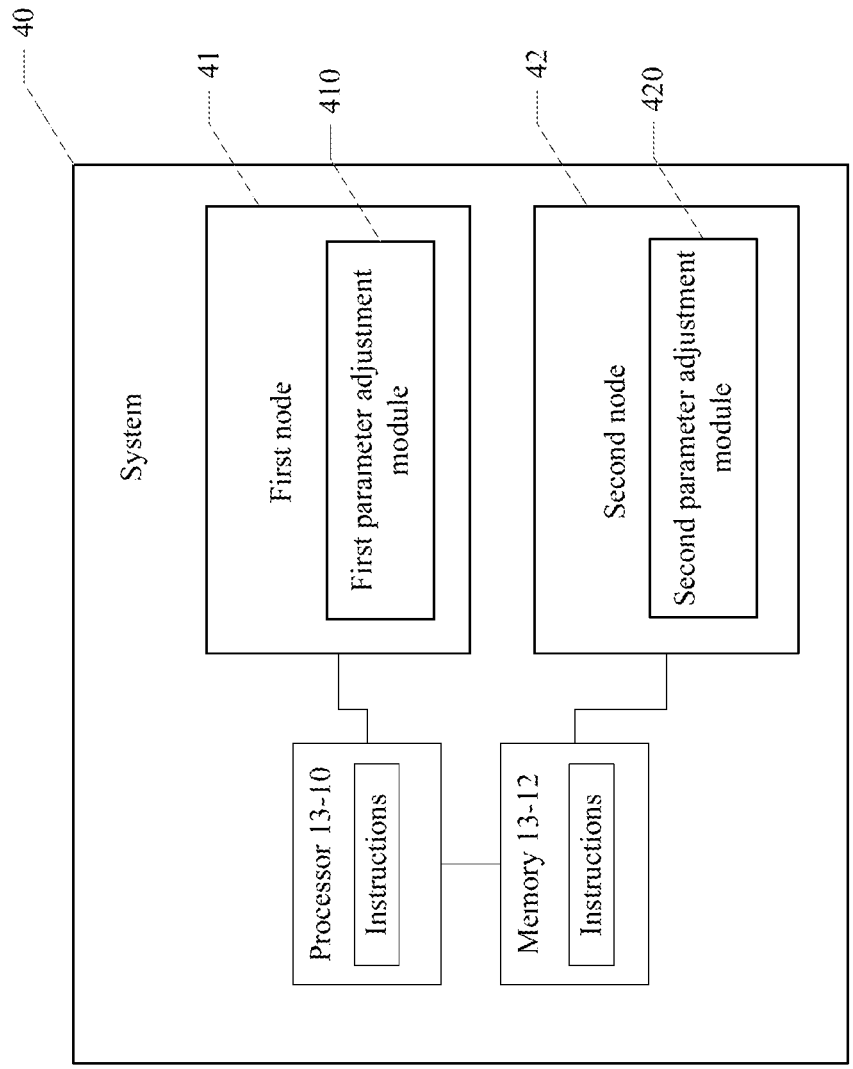
FIG. 13 shows the structural diagram of a system of the data transfer method provided by another example of the present disclosure

FIG. 13 shows the structural diagram of a system of the data transfer method provided by another example of the present disclosure. As shown in FIG. 13, the data transfer system 40 is configured between multiple clients and the destination node, and comprises a first node 41 and a second node 42. Each node shown in FIG. 13 may have one or more processors 31-10 that execute instructions that are stored in the memory 13-12.

In the present example, a TCP persistent connection is established between the first node 41 and the second node 42. Persistent connections are established between clients and the first node 41 and between the first node 41 and second node 42 to complete data exchange. After a read/write operation is completed, the connections between these nodes are not removed unsolicited. Thus, when there is a mass concurrent data transfer, the problems with a non-persistent connection, such as low processing speed, congestion, abnormal connection, and connection interruption, may be avoided to improve data transfer stability and efficiency.

The connection established between the second node 42 and the destination node is a TCP non-persistent connection. The second node and destination node are often deployed in the same region or on the same network. Therefore, the mutual access delay due to establishment of a non-persistent connection between the second node 42 and the destination node is negligible. In addition, the system may fully benefit from simple management of a non-persistent connection, no waste of any existing connection, and no need for any additional controls.

The functions and modules of the first node 41 are basically the same as those of the first node 31 described in the preceding example. The functions and modules of the second node 42 are basically the same as those of the second node 31 described in the preceding example.

Further, in the present example, the first node 41 may further comprise a first parameter adjustment module 410, and the second node 42 may further comprise a second parameter adjustment module 420. The first parameter adjustment module 410 and the second parameter adjustment module 420 are respectively used to adjust the system TCP parameters in the first node 41 and the second node 42.

Specifically, parameters including ip_local_port_range, nf_conntrack_max, tcp_max_syn_backlog, tcp_max_syn_backlog, tcp_max_orphans, file-max and nr_open, max_user_watches, tcp_wmem and tcp_rmem, rmem_max, wmem_max, sg and gso may be adjusted.

Wherein, the parameter ip_local_port_range limits the total number of ports that application programs can use when the server sends requests to other servers as a client using TCP in the kernel. This value is stored in the kernel by using the unsigned short type. When a certain number of ports are reserved in the kernel, this parameter may be set to its maximum value.

The nf_conntrack_max parameter specifies the maximum number of connections that a firewall tracks. Generally, with the firewall enabled, after the corresponding rule is configured, the state of each connection is recorded in the conntrack file in the kernel. If the value of this parameter is too small, it can result in failure of subsequent attempts to track a connection and also adverse effect on connection establishment; if the value of this parameter is too large, it can result in a very slow search during connection tracking and also adverse effect on connection establishment.

Generally, the formula CONNTRACK_MAX=RAMSIZE (in bytes)/16384/(computer digit number/32) may be used to calculate the value to which this parameter should be set. However, unless otherwise restricted by other additional rules, the conntrack module of the firewall may be uninstalled from a server with high concurrent connections.

The parameter tcp_max_syn_backlog is used to control the semi-connection queue formed during connection establishment. A semi-connection queue is jointly determined by the parameters tcp_max_syn_backlog, somaxconn, and backlog.

The value of backlog may be increased and then somaxconn and tcp_max_syn_backlog used to fine tune the semi-connection queue. A TCP semi-connection queue decides the number of concurrent connections accepted. This parameter is very useful in the case of high concurrent connections. For example, in the case of 8 GB memory, if the number of connections is large, backlog may be set to be within the range 100 W~ 250 W. Generally, in the case backlog is set to 250 W and somaxconn to 1024, if the kernel displays the prompt "syn_flooding" or the value of the system kernel parameter TcpExtListenDrops increases after the system starts running, the value of somaxconn may be multiplied by 2.

The parameter tcp_syncookies is used to specify whether the syncookies function is enabled in the kernel. In the case of large concurrent connections, the syncookies function is also very helpful to the concurrent access capacity of the system. Therefore, it is advisable to enable the syncookies function.

The parameter tcp_max_orphans is used to specify the maximum number of connections that do not belong to a process (for example, a connection removed by a process but in the timewait state). Large concurrent connections inevitably are associated with vast connection establishment and closing. This value may be increased properly as needed. The value of tcp_max_orphans may be set to about four times the actual maximal number of connections. For example, the value may be set to within the range of 100 W to 250 W.

The parameter file-max specifies the maximum number of files that may be opened in the system. The parameter nr_open specifies the maximum number of files that may be opened by a single process. These two parameters can also be set to values larger than the number of connections that a single unit needs to support.

In addition, the parameters hard nofile and soft nofile can also be set as needed; these two parameters also specify the maximum number of files that may be opened by a single process.

If epoll is used to listen on such events, the maximum number of files on which epoll can listen can also be set to a large value. Preferably, the parameter max_user_watches may be set to a value equal to that of the parameter file-max.

In addition, the parameter min_epoll_wait_time may be set to 1, in ms, to ensure that epoll can refresh in time the cached data.

The parameters tcp_wmem, tcp_rmem, rmem_max, and wmem_max are memory-related and may be set according to the characteristics of actual request packets.

The features sg and gso may be used to improve the performance of a network interface card (NIC) when the NIC processes large packets, but these features occupy certain amounts of memory. These features may be enabled or disabled as needed.

The above-mentioned process of adjusting the system TCP parameters of the first node and the second node can maximize the access capacity of a server as a single unit.

All the above-mentioned modules may be implemented using software codes as instructions. In this case, the above-mentioned modules may be stored in the memories of each server or node. The above-mentioned modules may also be implemented by using hardware, such as chips. In addition, the modules may be combined according to the actual needs.

Note that the function modules of the present example may be implemented according to the methods described in the above-mentioned example. For details about implementation, see the description of the above-mentioned example.

To sum up, in the present example, the first node, on receiving the request data sent by multiple clients, adds the corresponding label to the request data sent by each client, and sends the labeled request data to the second node by using the same connection channel; the second node removes the label from the request data and sends the unlabeled request data to the destination node for processing. The second node receives the processing result data returned by the destination node respectively corresponding to each request data, adds the corresponding label to each processing result data, and returns the labeled processing result data to the first node by using the same connection channel; the first node returns the unlabeled processing result data respectively to the client corresponding to the label. The label corresponding to a client is unique across the network.

Therefore, even if the first node sends the request data corresponding to multiple clients to the second node by using the same connection channel, the second node can determine the correspondence between the request data and clients based on the label in the request data.

In addition, the first node can also determine to which client the processing result data should be returned based on the label in the processing result data. Therefore, the data transfer between the first node and second node is port-independent. Multiple requests sent by multiple clients to the first node by using different connections may be sent to the second node by using the same connection. Thus, converged connection is implemented to save port resources, thereby improving the access capacity of the equipment as a single unit and reducing costs.

Note that all the examples in this specification are described progressively. Description of each example is focused on how it is different from the other examples. For information about the similar or identical parts of the examples, cross reference these examples.

An example that describes a device is basically the same as the example that describes the method. Therefore, the description of an example that describes a device is relatively simple. For details about relevant device information, see the corresponding description in the method example.

Note that, in this document, relational terms such as "first" and "second" are only used to distinguish an entity or operation from another entity or operation, not necessarily requiring or suggesting that such an actual relation or sequence exist between these entities or operations. In addition, the terms "comprise", "include", and any other variants indicate inclusion but not exclusion.

Thus, the process, method, article, or device that contains a series of factors include not only those factors but also other factors no expressly listed, or include the factors inherent in such process, method, article, or device. Without further restrictions, for a factor defined by the statement "comprises a . . . ", additional identical factors may not be excluded from the process, method, article, or device that contains the factor.

Those of ordinary skill in the existing art can understand that all of or part of the steps described in the above-mentioned examples may be completed by hardware or by related hardware as instructed by a program. The program may be stored on a computer-readable storage medium. The computer-readable storage may be either transitory or non-transitory. The storage medium may be a Read-Only Memory (ROM), a magnetic disk, or an optical disk.

While the present disclosure has been particularly disclosed and described above with reference to the preferred examples, it should be understood that the description is not intended to limit the present disclosure. Those of ordinary skill in the existing art may make equivalent examples with certain changes or modifications by utilizing the above-disclosed technical contents, without departing from the technical solution scope of the present disclosure. Any alterations, equivalent changes, or modifications made to the above-mentioned examples based on the technical essence of the present disclosure without departing from the technical solution contents of the present disclosure shall fall within the scope of the present disclosure.

What is claimed is:

1. A method for transferring data between a plurality of clients and a destination node, wherein at least a first node and a second node are situated between the plurality of clients and the destination node, comprising:
   adjusting system TCP parameters of the first node, the second node, and the destination node, wherein:
      ip_local_port_range is set to a maximum value;
      a conntrack module of a firewall is uninstalled;
      a maximum port backlog is set to a maximum value;
      a syncookie function is enabled;
      tcp_max_orphans is set to four times an actual maximum number of connections; and
      file-max and nr_open are set to values that are greater than a number of connections that a single unit needs to support;
   receiving, by a processor of the first node, request data sent by the plurality of clients, adding a unique label to the request data sent by each of the plurality of client, and sending the labeled request data to the second node by using a first connection channel;
   removing, by a processor of the second node, the unique label from the request data corresponding to each of the plurality of clients, and sending the request data with the unique label removed to the destination node for processing;
   receiving, by the processor of the second node, the result data returned by the destination node corresponding to the request data, adding the unique label to the result data, and returning the result data with the unique label to the first node by using the first connection channel; and
   removing, by the first node, the unique label from the result data and returning the result data with the unique label removed to the plurality of clients corresponding to the unique label.

2. The method of claim 1, wherein the first connection channel is a persistent connection based on a Transmission Control Protocol (TCP).

3. The method of claim 1, wherein the receiving the request data sent by the plurality clients comprises:
   establishing the first connection channel between the first node and the second node; and
   receiving, by the first node with the processor, the request data sent by each of the plurality of clients by using one of the plurality of second connection channels.

4. The method of claim 3, wherein:
   the plurality of second connection channels that are established between the first node and the plurality of clients comprise at least one of: a TCP persistent connection or a TCP non-persistent connection.

5. The method of claim 1, wherein the sending the request data with the unique label removed to the destination node for processing comprises:
   establishing a plurality of third connection channels between the second node and the destination node, and
   sending, by the second node with the processor, the request data corresponding to each of the plurality of clients to the destination node by using one of the plurality of third connection channels.

6. The method of claim 5, wherein the establishing the plurality of third connection channels comprises at least one of: a TCP persistent connection or a TCP non-persistent connection.

7. The method of claim 5, wherein:
   the receiving, by the first node with the processor, the request data sent by the plurality of clients comprises:
      establishing a plurality of TCP persistent connections between the first node and the plurality of clients, and
      receiving, by the first node with the processor, the request data sent by each of the plurality of clients by using one of the plurality of TCP persistent connections; and
   the sending the request data with the unique label removed to the destination node for processing comprises:
      establishing a plurality of TCP non-persistent connections between the second node and the destination node, and
      sending, by the processor of the second node, the request data corresponding to each of the plurality of clients to the destination node by using one of the plurality of TCP non-persistent connections.

8. The method of claim 1, wherein the unique label is added as a packet header to the request data or to the processing result data.

9. The method of claim 1, wherein the removing the unique label from the request data corresponding to each of the plurality of client further comprises:
reading, by the second node with the processor, the unique label in the request data corresponding to each of the plurality of clients;
searching the unique label locally;
when the unique label is found, sending, by the second node with the processor, the request data with the unique label removed directly to the destination node; and
when the unique label is not found, registering, by the second node with the processor, a client corresponding to the unique label locally and sending the request data with the unique label removed to the destination node.

10. The method of claim 9, further comprising:
before the reading the unique label in the request data corresponding to each of the plurality of clients, verifying integrity of the request data.

11. The method of claim 1, wherein:
a first distance between the first node and the plurality of clients is smaller than a first threshold,
a second distance between the first node and the second node is greater than a second threshold, and
a third distance between the second node and the destination node is smaller than a third threshold, wherein the third threshold is greater than the first threshold and the second threshold.

12. A data transfer system used for transferring data between multiple clients and a destination node, comprising a first node and a second node, wherein:
the first node having one or more processors coupled with a memory is used to:
generate a unique label for each of the multiple clients when multiple second connection channels are established between the first node and the multiple clients, wherein the unique label comprises a character string,
receive request data sent by the multiple clients,
add the unique label to the request data sent by each of the multiple client, and
send the labeled request data to the second node by using a first connection channel;
the second node having one or more processors coupled with a memory is used to:
remove the unique label from the request data corresponding to each of the multiple clients,
send the request data with the unique label removed to the destination node for processing,
receive result data returned by the destination node corresponding to the request data,
add the unique label to the result data, and
return the result data with the unique label to the first node by using the first connection channel;
the first node is used to:
remove the unique label from the result data, and
return the result data with the unique label removed to the client corresponding to the label; and
the first node, the second node, and the destination node are used to:
set ip_local_port_range to a maximum value,
connect a conntrack module of the firewall,
set a maximum port backlog to a maximum value,
enable a syncookie function,
set tcp_max_orphans to four times an actual maximum number of connections, and
set file-max and nr_open to values that are greater than a number of connections that a single unit needs to support.

13. The system of claim 12, wherein the first connection channel is a TCP persistent connection.

14. The system of claim 13, wherein:
the first node is further used to:
establish multiple TCP persistent connections between the first node and the multiple clients, and
receive the request data sent by each of the multiple clients by using one of the multiple TCP persistent connections; and
the second node is further used to:
establish multiple TCP non-persistent connections between the second node and the destination node, and
send the request data corresponding to each of the multiple clients to the destination node by using the one of multiple TCP non-persistent connections.

15. The system of claim 12, wherein, when the first node is used to receive the request data sent by the multiple clients, the first node is used to:
establish the first connection channel between the first node and the second node; and
receive the request data sent by each of the multiple clients by using one of the multiple second connection channels.

16. The system of claim 15, wherein the multiple second connection channels established between the first node and the multiple clients comprise at least one of: a TCP persistent connection or a TCP non-persistent connection.

17. The system of claim 12, wherein the second node is used to:
establish the first connection channel between the first node and the second node;
establish a plurality of third connection channels between the second node and the destination node;
by using the first connection channel, receive the labeled request data sent by the first node;
receive the result data returned by the one of the multiple third connection channels that corresponds to the request data; and
send the request data corresponding to each of the multiple clients to the destination node by using one of the multiple third connection channels.

18. The system of claim 17, wherein the multiple third connection channels established between the second node and the destination node comprises at least one of: a TCP persistent connection or a TCP non-persistent connection.

19. The system of claim 12, wherein the unique label is added as a packet header to the request data or to the processing result data.

20. The system of claim 12, wherein the second node is further used to:
read the unique label in the request data corresponding to each of the multiple clients,
search the unique label locally,
when the unique label is found, send the request data with the unique label removed to the destination node directly, and
when the unique label is not found, register a client corresponding to the unique label locally and then send the request data with the unique label removed to the destination node.

21. The system of claim 20, wherein the second node is further used to verify the integrity of the request data.

22. The system of claim 12, wherein:
a first distance between the first node and the multiple clients is smaller than a first threshold, a second distance between the first node and the second node is greater than the second threshold, and
a third distance between the second node and the destination node is smaller than a third threshold, wherein the second threshold is greater than the first threshold and the second threshold.

* * * * *